Patented May 6, 1924.

1,492,810

UNITED STATES PATENT OFFICE.

WILLIAM N. ROSSBERG AND GUY E. SHERIDAN, OF BUTTE, MONTANA.

MANUFACTURE OF CALCIUM SULPHIDE, ETC.

No Drawing. Application filed March 2, 1921. Serial No. 449,081.

*To all whom it may concern:*

Be it known that we, WILLIAM N. ROSSBERG and GUY E. SHERIDAN, both citizens of the United States, and both residents of Butte, county of Silverbow, and State of Montana have invented certain new and useful Improvements in the Manufacture of Calcium Sulphide, Etc., and we do hereby declare the following to be a full, clear, and exact description of the invention, such as will enable others skilled in the art to which it appertains to make and use the same.

This invention relates to a method for the manufacture of calcium sulphide and similar sulphides and has for one of its objects the convenient and economical production of a sulphide from which hydrogen sulphide can be prepared for use in metallurgical processes.

A further object of the invention is to utilize abundant sources of supply of naturally occurring sulphates, particularly calcium sulphate which is widely distributed in nature and may frequently be conveniently obtained near the locality where it is desired to utilize the hydrogen sulphide in metallurgical operations.

While the invention is particularly applicable to the production of calcium sulphide it may also be applied to the production of other alkaline earth sulphides such as barium and strontium sulphides or it may even be applied to the production of the sulphides of metals of the alkali metal group.

The process of the present invention, in its preferred form, depends upon the reduction of calcium sulphate to calcium sulphide by means of carbon or reducing gases, or both. While such reduction processes have been known for a long time, the successful carrying out of the process in a practicable commercial manner is beset with many difficulties. With the methods and apparatus hitherto proposed for use these difficulties are such as to render the methods impracticable for the purposes mentioned.

Heretofore, for example, it has been customary to carry out the reduction of calcium sulphate by merely mixing it with the required amount of carbon and heating the mixture in crucibles or retorts or muffle furnaces of a type in which the hot combustion gases from the furnace do not come into direct contact with the material being treated. These prior processes, however, have the inherent difficulties referred to above, including the labor required for charging and discharging the crucibles or the like as well as to the wastage of heat and coal involved, the formation of dust, and other practical difficulties met with in operating installations of this type on a scale sufficiently large for the production of a product suitable for use in metallurgical processes.

Furthermore, the reduction of the sulphate to sulphide is difficult to control. For example, the rate of reduction may proceed so rapidly as to cause serious loss of carbon and of material carried away by the too rapid evolution of the gases, or, on the other hand, the rate may be so slow that the time required renders the process unprofitable. Likewise the reduction may not take place uniformly throughout the charge, and excessive amounts of carbon may be required for complete reduction due to this and other like causes; or, on the other hand it is often impracticable to carry the reduction sufficiently near to completion for similar reasons.

In the process of the present invention the foregoing difficulties are largely overcome. According to the present invention the reduction is carried out with control of the physical structure and chemical composition of the charge and in directly fired furnaces such as reverberatory, revolving cylindrical or shaft furnaces in which the hot combustion gases come into direct contact with the mixture of sulphate and carbon. So also, the process of the present invention involves controlling the rate of reduction, moisture content, and powdery nature of the charge, so as to avoid loss of material through the formation of flue dust, and also involves controlling the porosity of the mixed charge so as to bring about intimate contact of the reducing gases with the whole of the sulphate in the charge.

It is a characteristic advantage of the process of the present invention, that the use of a direct fired furnace gives the maximum ease and facility in handling the material charged, as well as the product produced.

A particularly valuable embodiment of the present invention involves the carrying out of the process in a continuous rotary kiln, heated internally in any suitable way, and into which the charge is continuously fed and the product continuously removed. The presence of the added sodium sulfate or other salt causes the charge to sinter together to a greater or less extent into granules and lumps, thus promoting the operation which goes on in the rotary kiln and reducing the loss of the ingredients of the charge by the carrying away of fine particles with the escaping products of combustion. That is, the charge used in the process of the present invention enables the process to be carried out to particular advantage in a continuously operating furnace of the rotary kiln type, so that the calcium sulfide can be produced continuously and on a large scale, well adapted for commercial operations.

The following example will serve to illustrate the manner of applying the present invention to the production of calcium sulphide from gypsum.

The gypsum is pulverized, for example, so that 90% will pass a 100 mesh screen and is then mixed whilst dry or in a moist state, with about 40% of its own weight of pulverized coal. It will be understood that the exact percentages of gypsum and coal will depend somewhat upon the general character and grade of the raw materials. Best results are usually obtained by pulverizing the coal so that it will pass a 20 mesh sieve or even grinding it somewhat finer than this.

The mixture of gypsum and coal is now moistened preferably with a saturated or strong solution of sodium sulphate. The amount of sodium sulphate added in this form calculated as anhydrous sodium sulphate should correspond to about 8 to 10% by weight of gypsum. Excessive moisture in the mixture should be avoided and this can be controlled ordinarily by using a hot saturated or strong solution of sodium sulphate which will contain more sodium sulphate and less water than is present in a cold saturated solution of the same salt.

The mixture of gypsum, coal and sodium sulphate is now introduced preferably into a directly fired furnace of the cylindrical rotary kiln type, and is subjected to a temperature of about 900° C. to 1000° C. for a period of about ninety minutes, during its passage therethrough. After the calcium sulphate is reduced to calcium sulphide the finished product is withdrawn from the furnace, hot, and the withdrawn charge is allowed to cool preferably in an inert atmosphere, such as the waste gases from the furnace, in order to prevent decomposition by the action of the air.

In some instances it is preferable to use plaster of Paris in place of the gypsum in the foregoing example, for the reason that plaster of Paris possesses setting qualities and, therefore, after treatment with the sodium sulphate solution in the manner described, the mixture will tend to form porous lumps having the advantageous characteristics pertaining to briquettes in processes of this character. These lumps facilitate the charging of the furnace and aid in eliminating the formation of flue dust with accompanying loss of material.

Instead of using sodium sulfate, other suitable salts can be used which are capable of fusing sufficiently under the conditions of operation to act as a binder and convert the mass into lumps and particles, so as to prevent their being carried away in the form of flue dust by the draft of the furnace. Also, the salt used should have such a solubility that the use of the required amount of salt in the form of a saturated solution of the same does not introduce too much moisture into the charge. Thus niter cake (sodium acid sulphate) may frequently be substituted for sodium sulphate to advantage where the former salt is available.

The controlling of the amount of moisture in the charge (by regulating the amount in the salt solution used) is important as one of the means for regulating the rate of combustion of the coal in the charge, thus preventing wastage of fuel and a too rapid evolution of gases from the interior of the charge.

What we claim is:

1. The process of reducing an alkaline earth metal sulfate to an alkaline earth metal sulfide, which comprises treating a mixture of the sulfate and carbonaceous material with a solution of an inorganic salt capable of fusing at a relatively low temperature to form a sintered mass, and heating the mixture by direct heat until the sulfate is reduced to sulfide.

2. The process of reducing an alkaline earth metal sulfate to an alkaline earth metal sulfide, which comprises treating a mixture of the sulfate and carbonaceous material with a water solution of an inorganic salt capable of fusing at a relatively low temperature to form a sintered mass, controlling the quantity of water added by controlling the concentration of the solution of inorganic salt thereby reducing the rate of combustion of the carbonaceous material, and heating the mixture by direct heat until the sulfate is reduced to sulfide.

3. The process of reducing an alkaline earth metal sulfate to an alkaline earth metal sulfide, which comprises treating a mixture of the sulfate and carbonaceous material with a solution of a very soluble inorganic salt capable of fusing at a relatively low temperature to form a sintered mass, and heating the mixture by direct heat until the sulfate is reduced to sulfide.

4. The process of reducing an alkaline earth metal sulfate to an alkaline earth metal sulfide, which comprises treating a mixture of the sulfate and carbonaceous material with a solution of an inorganic salt capable of fusing at a relatively low temperature to form a sintered mass, and supplying the mixture to a continuously operating rotary kiln wherein it is subjected to direct heat until the sulfate is reduced to sulfide.

5. The process of reducing calcium sulphate to calcium sulphide, which comprises mixing the sulphate in the form of plaster-of-Paris together with water and an inorganic salt capable of fusing at a relatively low temperature to form a sintered mass, and heating the mixture by direct heat until the sulphate is reduced to sulphide in the course of which the plaster-of-Paris promotes the binding of the charge into lumps.

6. The process of reducing calcium sulphate to calcium sulphide, which comprises supplying the sulphate in the form of plaster-of-Paris together with water and an inorganic salt capable of fusing at a relatively low temperature to form a sintered mass, to a continuously operated rotary kiln, and heating the mixture therein by direct heat until the sulphate is reduced to sulphide, in the course of which the plaster-of-Paris promotes the binding of the charge into lumps.

7. The method of reducing calcium sulfate to calcium sulfide, which comprises treating a mixture of the sulfate and carbonaceous material with a solution of sodium sulfate, and heating the mixture by direct heat to form a sintered mass and reduce the calcium sulfate to sulfide.

In testimony whereof we affix our signatures.

WILLIAM N. ROSSBERG.
GUY E. SHERIDAN.